United States Patent [19]

Bouchard

[11] Patent Number: 4,539,510
[45] Date of Patent: Sep. 3, 1985

[54] COMPACT FLUORESCENT LAMP

[75] Inventor: Andre Bouchard, Peabody, Mass.

[73] Assignee: GTE Products Corporation, Stamford, Conn.

[21] Appl. No.: 538,407

[22] Filed: Oct. 3, 1983

[51] Int. Cl.³ .............................................. H01J 8/06
[52] U.S. Cl. .................................... 313/493; 313/318; 313/573; 445/26; 445/44
[58] Field of Search .................... 445/26, 44; 313/493, 313/573, 610, 318

[56] References Cited

U.S. PATENT DOCUMENTS 4,208,618  6/1980  Heine ............................... 313/493 X

FOREIGN PATENT DOCUMENTS 0044958  3/1982  Japan .................................... 313/493

Primary Examiner—Arthur Kellogg
Attorney, Agent, or Firm—Carlo S. Bessone; William H. McNeill

[57] ABSTRACT

A compact fluorescent employs a plurality of separate tubes. The ends of the tubes are formed to provide arc tight, depth regulating means in the form of a reduced diameter to seal within apertured arc directors.

3 Claims, 2 Drawing Figures

COMPACT FLUORESCENT LAMP

TECHNICAL FIELD

This invention relates to fluorescent lamps and more particularly to compact versions of such lamps having utility as replacements for incandescent lamps.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large "U" shaped lamps such as those shown in U.S. Pat. Nos. 3,602,755 and 2,401,228; and triple bend lamps such as shown in U.S. Pat. No. 4,347,460 exemplify other attempts.

Still other attempts are shown in U.S. Pat. Nos. 4,208,618; 4,191,907; and U.S. Pat. No. 4,524,301, filed Sept. 30, 1982 and assigned to the assignee or the instant invention.

While each of these proposals has its own advantages, disadvantages also exist. The previous forms of multiple tubing lamps are expensive to produce and difficult to handle during manufacture.

Lamps made with multiple separate tubes can have leakage problems if not properly mated.

Many types require expensive, custom made partitions and/or require large numbers of hermetic seals. Multiple bend tubes require large outlays for manufacturing equipment which adds to the cost of the final lamp.

DISCLOSURE OF THE INVENTION

It is, therefore, an object of the invention to obviate the disadvantages of the prior art.

It is another object of the invention to provide a compact fluorescent lamp.

Yet another object of the invention is the provision of a compact fluorescent lamp that is economical to fabricate.

These objects are accomplished, in one aspect of the invention, by the provision of a compact fluorescent lamp having a hermetically sealed outer envelope and an assembly of a plurality of phosphor coated tubes having ends associated with apertures in arc directing means. The ends of the tubes are formed to provide arc tight, depth regulating seating means. While the seals formed around the ends of the tubes are arc tight, they are permeable to the arc generating and sustaining medium atmospere which is provided within the hermetically sealed outer envelope.

Employment of this technique prevents arc leaks because the formed regions on the tube ends compensate for variations in tube diameter sizes and in aperture sizes.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Figure 1:
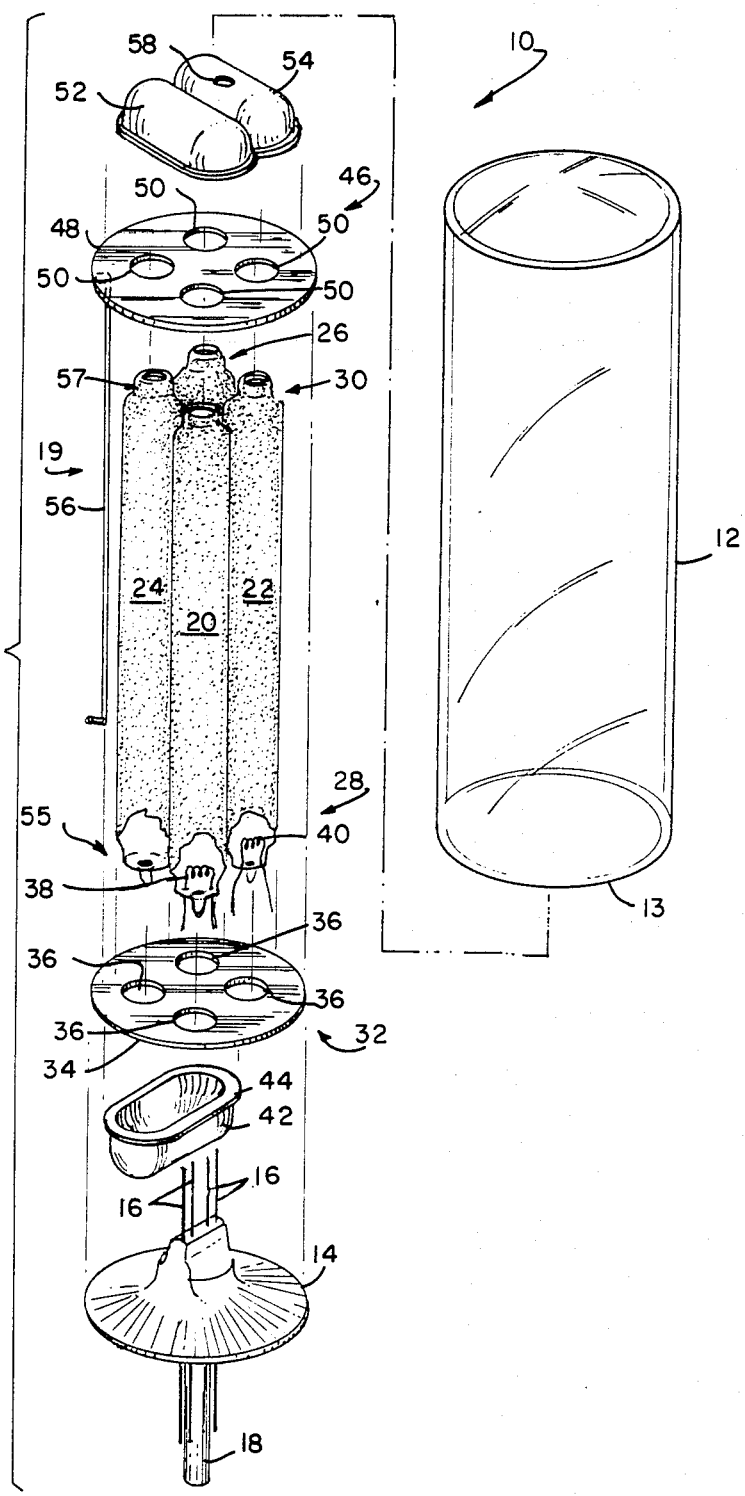
FIG. 1 is an exploded, perspective view of an embodiment of the invention.
Figure 2:
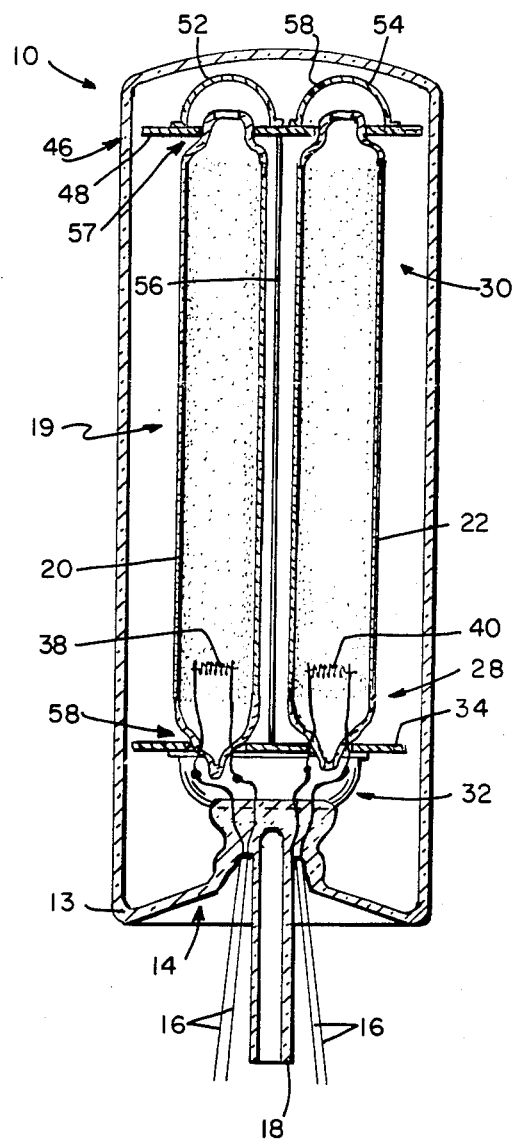
FIG. 2 is a sectional, elevational view of the embodiment of FIG. 1.

Referring now to the drawings with greater particularity, there is shown in FIG. 1 a compact fluorescent lamp 10 having an outer, light transmissive, glass envelope 12 which is hermetically sealed at its end 13 to a flare 14 which includes lead-in wires 16 and exhaust tubulations 18. An arc generating and sustaining atmosphere, e.g., about 20 mg of mercury and argon at a pressure 3 torr, is provided within envelope 12.

Also positioned within envelope 12 is an assembly 19 comprised of a plurality of elongated tubes 20, 22, 24 and 26 each having first ends 28 and second ends 30. These tubes are coated on their interior surface with a suitable U.V. excitable phosphor, e.g., a calcium halophosphate activated with antimony and manganese, or any operative phosphor or combination of phosphors. The phosphors can be applied by any suitable method, including those used to coat conventional fluorescent tubes.

In a preferred embodiment of the invention the tubes 20, 22, 24, and 26 are formed from T5 tubing and are about four inches long (approx. 10.16 cm). For ease in coating a single, long tube, say three feet long (approx. 1 m) can be coated and subsequently cut into appropriate lengths.

A first arc directing means 32 is associated with first ends 28 of tubes 20, 22, 24, and 26, and comprises a first base member 34 having apertures 36 therein for receiving the first ends 28 of the tubes.

Two of the tubes, e.g., 20 and 22, have their first ends 28 provided with electrodes 38 and 40. While these electrodes may be sealed into the tube ends in a conventional manner for convenience in handling, it is not necessary that a hermetic seal be formed, and the electrodes may be mounted within the tubes in any desired manner.

A single arc director 42 is positioned on the underside of first base member 34 and covers the apertures into which the first ends 28 of tubes 24 and 26 are fitted. As shown, arc director 42 is in the form of a rectangular dish having a peripheral rim 44 about its open side. The arc director 42 is affixed to the underside by any suitable means, if it is formed separated from first base member 34, although the entire arc directing means 34 can be formed as a one piece unit.

A second arc directing means 46 is associated with the second ends 30 of tubes 20, 22, 24, and 26 and comprises a second base member 48 having apertures 50 therein for receiving the second ends 30 of the tubes.

The upper side of second base member 48, i.e., the side remote from the tubes, has two arc directors 52 and 54 positioned thereon. The arc directors 52 and 54 can be of the same construction as arc director 42. Arc director 52 encompasses the apertures receiving the second ends 30 of the tubes 20 and 24; and arc director 54 encompases the apertures receiving the second ends 30 of the tubes 22 and 26.

A connecting rod 56 extends between the first base member 34 and the second base member 48 and is affixed thereto, thus securing the assembly 19 together as a unit.

To fit the ends 28 and 30 of tubes 20, 22, 24, and 26 within the apertures 36 and 50 in an arc tight manner, the ends 28 and 30 are formed with arc tight, depth regulating means 55 and 57 respectively. The means 55 and 57 comprise a reduced diameter portion formed on the terminus of the ends; the reduced diameter portion being connected to the given diameter of the tube by a radius. The means 55 and 57 could also be formed substantially frusto-conical. To insure the arc tight fit and regulate the seating depth of the tubes, the apertures 36 and 50 have diameters greater than the reduced diameter and less than the given diameter of the tubes. This construction allows the ends of the tubes to penetrate through aperture 36 and 50 to the arc directors 42, 52 and 54 a sufficient distance for good seating and to allow the formation of an arc tight but atmosphere permeable fit when ends 28 and 30 engage a surface adjacent apertures 36 and 50, respectively. Further, this construction allows this desired fit within the limits of normal manufacturing tolerances between the tube ends and the apertures.

To further aid in evacuation and to insure the atmosphere within the outer envelope penetrates the tubes, at least one of the arc directors, e.g., 54, is provided with an opening 58 therein.

In operation, the arc will proceed, during each half cycle, from electrode 38 up the length of tube 20, across arc director 52, down tube 24, across arc director 42, up tube 26, across arc director 54, and down tube 22 to electrode. On the following half cycle, of course, the direction will be reversed.

Lamps constructed as described above have many advantages over those of the prior art. Simple, mechanical joints are employed together with novel arc directors, to form a long arc path in a compact lamp. The lamps can be constructed with a range of tube quantities and tube lengths giving flexibility to the size and output of the lamps.

The lamps can be operated at high electrical loadings because the arc directing means provide a shielding effect, thus allowing the mercury vapor pressure to be held at a lower temperature.

The tubes can be constructed from a variety of materials since no seals are required internally.

Because each of the tubes is a separate entity, each of the tubes can have a different phosphor applied thereto, thus allowing for color blending.

Further, the lamps are adaptable to high speed manufacturing techniques because of the mechanical nature of the inner assembly.

Additionally, the second arc directing means 46 can be eliminated by employing two "U" shaped tubes, as shown in Ser. No. 481,230, filed Apr. 1, 1983 and assigned to the assignee of the present invention.

There is thus provided a novel, compact fluorescent lamp having the advantages enumerated above, over the prior art.

In the event that arcing between the electrode lead-in wires 16 is a problem, small glass tubing can be used to surround them.

While there have been shown what are at present considered to be preferred embodiments of the invention, it will be apparent to those skilled in the art that various changes and modifications can be made herein without departing from the scope of the invention as defined by the appended claims.

I claim:

1. In a compact fluorescent lamp having a hermetically sealed outer envelope and an assembly of a plurality of phosphor coated tubes, at least some of said tubes having ends associated with a respective aperature in arc directing means, the improvement comprising: arc tight, depth regulating seating means formed on said ends of said at least some of said tubes for regulating the depth penetration of said at least some of said tubes through said respective aperture and for insuring an arc tight fit when said ends having a diameter relative to the diameter of said respective aperture engage a surface adjacent said respective aperture.

2. The lamp of claim 1 wherein said tubes have a given diameter and said arc tight, depth regulating seating means comprise a reduced diameter portion formed on the terminus of said end, said reduced diameter portion being connected to said given tube diameter by a radius.

3. The lamp of claim 1 wherein said ends of said tubes are substantially frusto-conical.

* * * * *